United States Patent
Sampath et al.

(10) Patent No.: US 9,699,667 B2
(45) Date of Patent: Jul. 4, 2017

(54) SYSTEMS AND METHODS TO TRANSMIT CONFIGURATION CHANGE MESSAGES BETWEEN AN ACCESS POINT AND A STATION

(71) Applicant: Qualcomm Incorporated, San Diego, CA (US)

(72) Inventors: Hemanth Sampath, San Diego, CA (US); Maarten Menzo Wentink, Naarden (NL); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/735,956

(22) Filed: Jan. 7, 2013

(65) Prior Publication Data

US 2013/0176925 A1    Jul. 11, 2013

Related U.S. Application Data (60) Provisional application No. 61/584,667, filed on Jan. 9, 2012.

(51) Int. Cl.
| | |
|---|---|
| *H04W 24/02* | (2009.01) |
| *H04W 52/02* | (2009.01) |
| *H04W 72/04* | (2009.01) |
| *H04L 25/02* | (2006.01) |
| *H04L 25/03* | (2006.01) |

(52) U.S. Cl.
CPC ......... *H04W 24/02* (2013.01); *H04L 25/0204* (2013.01); *H04L 25/0228* (2013.01); *H04L 25/03159* (2013.01); *H04W 52/0209* (2013.01); *H04W 72/042* (2013.01)

(58) Field of Classification Search
CPC . H04W 84/12; H04W 52/0219; H04W 88/08; H04W 52/0206; H04W 72/042; H04W 72/1268
USPC ......... 370/311, 338, 328, 254, 329; 455/423
See application file for complete search history.

(56) References Cited

U.S. PATENT DOCUMENTS

| | | | |
|---|---|---|---|
| 7,158,778 B2 * | 1/2007 | Sameer et al. | 455/412.2 |
| 7,362,722 B2 * | 4/2008 | Otsuka | 370/328 |

(Continued)

FOREIGN PATENT DOCUMENTS

| | | |
|---|---|---|
| CN | 1825992 A | 8/2006 |
| CN | 101163124 A | 4/2008 |

(Continued)

OTHER PUBLICATIONS

International Search Report and Written Opinion—PCT/US2013/020857—ISA/EPO—Aug. 7, 2013.

(Continued)

*Primary Examiner* — Edan Orgad
*Assistant Examiner* — Emmanuel Maglo
(74) *Attorney, Agent, or Firm* — Eric Ho (57) ABSTRACT

A particular method includes transmitting a frame from a station to an access point. The frame includes a beacon sequence number related to a configuration of the access point. The method also includes, in response to transmitting the frame, receiving an update frame from the access point. The update frame indicates at least one change in the configuration of the access point.

39 Claims, 6 Drawing Sheets

(56) References Cited

U.S. PATENT DOCUMENTS

| | | | |
|---|---|---|---|
| 7,447,187 B2* | 11/2008 | Hoffmann | H04B 1/707 370/342 |
| 7,586,864 B2* | 9/2009 | Aoki | 370/318 |
| 7,904,086 B2* | 3/2011 | Kundu | H04W 36/30 455/436 |
| 8,089,927 B2* | 1/2012 | Matsuo et al. | 370/329 |
| 8,160,045 B1* | 4/2012 | Chhabra | H04W 52/0209 370/342 |
| 8,170,002 B2 | 5/2012 | Wentink | |
| 8,345,645 B2* | 1/2013 | Kuc | 370/338 |
| 8,380,203 B1* | 2/2013 | Semersky | H04W 36/023 370/311 |
| 8,457,029 B2* | 6/2013 | Vaidya et al. | 370/311 |
| 8,477,674 B2* | 7/2013 | Kneckt et al. | 370/312 |
| 8,537,875 B2* | 9/2013 | Soriaga | H04W 52/325 375/130 |
| 8,711,820 B2* | 4/2014 | Grandhi | 370/338 |
| 2003/0010662 A1* | 1/2003 | King | B65H 49/38 206/391 |
| 2003/0185244 A1* | 10/2003 | Wu | H04L 63/10 370/503 |
| 2006/0067263 A1* | 3/2006 | Li et al. | 370/315 |
| 2007/0097933 A1* | 5/2007 | Kuc | 370/338 |
| 2007/0104203 A1* | 5/2007 | Sood | H04L 63/14 370/394 |
| 2007/0258397 A1* | 11/2007 | Ho et al. | 370/328 |
| 2008/0225768 A1 | 9/2008 | Wentink | |
| 2009/0040965 A1* | 2/2009 | Matsuo et al. | 370/328 |
| 2009/0191860 A1* | 7/2009 | Oh et al. | 455/423 |
| 2010/0002627 A1* | 1/2010 | Ngo | H04W 74/02 370/328 |
| 2010/0061326 A1* | 3/2010 | Lee | H04W 88/06 370/329 |
| 2010/0074236 A1* | 3/2010 | Takeda et al. | 370/338 |
| 2010/0111066 A1* | 5/2010 | Mehta | H04W 52/0216 370/345 |
| 2010/0142426 A1* | 6/2010 | Taniuchi et al. | 370/311 |
| 2010/0202354 A1* | 8/2010 | Ho | G06Q 10/06 370/328 |
| 2010/0232337 A1* | 9/2010 | Das | H04W 4/12 370/312 |
| 2010/0329232 A1* | 12/2010 | Tubb | E05B 39/00 370/345 |
| 2011/0014894 A1* | 1/2011 | Batkin et al. | 455/410 |
| 2011/0292925 A1* | 12/2011 | Ho et al. | 370/338 |
| 2011/0299423 A1* | 12/2011 | Shim | H04L 47/24 370/254 |
| 2012/0014414 A1* | 1/2012 | Jeong | H04B 1/7143 375/138 |
| 2012/0051365 A1 | 3/2012 | Bahr et al. | |
| 2012/0063397 A1 | 3/2012 | Abedi et al. | |
| 2012/0106418 A1 | 5/2012 | Xhafa et al. | |
| 2012/0120892 A1 | 5/2012 | Freda et al. | |
| 2012/0198345 A1* | 8/2012 | von Eicken et al. | 715/735 |
| 2012/0201231 A1* | 8/2012 | Omeni | H04B 7/2656 370/337 |
| 2012/0265846 A1* | 10/2012 | Emerson | 709/217 |
| 2013/0077554 A1* | 3/2013 | Gauvreau | H04L 5/001 370/312 |
| 2014/0204925 A1* | 7/2014 | Otomo | 370/338 |
| 2014/0204926 A1* | 7/2014 | Ota et al. | 370/338 |

FOREIGN PATENT DOCUMENTS

| | | |
|---|---|---|
| CN | 101959207 A | 1/2011 |
| CN | 102510566 A | 6/2012 |
| JP | 2007019607 A | 1/2007 |
| RU | 2242095 C2 | 12/2004 |
| WO | WO-0031996 A2 | 6/2000 |
| WO | 2008133476 A1 | 11/2008 |
| WO | 2013032657 A1 | 3/2013 |

OTHER PUBLICATIONS

Jeongki Kim (LG Electronics): "TGai Specification Text for enhanced active scanning procedure for FILS; 11-12-1114-06-00ai-tgai-specification-text-for-enhanced-active-scanning-procedure-for-fils", IEEE SA Mentor; 11-12-1114-06-OOAI-TGAI-SPECIFICATION-TEXT-FOR-ENHANCED-ACTIVE-SCANNING PROCEDURE-FOR-FILS, IEEE-SA MENTOR, Piscataway, NJ USA, vol. 802.11ai, No. 6, Nov. 14, 2012 (Nov. 14, 2012), pp. 1-6, XP068039847, [retrieved on Nov. 14, 2012] the whole document.

International Search Report and Written Opinion—PCT/CN2012/083814—ISA/EPO—Apr. 18, 2013.

Kim, J., et al., "System information update procedure for 11 ah", IEEE 802.11-12/1093R0, vol. IEEE 802.11ah, Sep. 17, 2012 (Sep. 17, 2012), pp. 1-11, XP002694803.

Partial International Search Report—PCT/US2013/020857—ISA/EPO—May 2, 2013.

Simon E Merlin (Qualcomm Inc): "Short Beacon; 11-11-1503-01-00ah-short-beacon", IEEE Draft; 11-11-1503-01-00AH-SHORT-BEACON, IEEE-SA MENTOR, Piscataway, NJ USA, vol. 802.11ah, No. 1, Nov. 9, 2011 (Nov. 9, 2011), pp. 1-11, XP017673186.

European Search Report—EP15160502—Search Authority—The Hague—Jul. 22, 2015.

European Search Report—EP15160505—Search Authority—The Hague—Jul. 22, 2015.

* cited by examiner

SYSTEMS AND METHODS TO TRANSMIT CONFIGURATION CHANGE MESSAGES BETWEEN AN ACCESS POINT AND A STATION

I. CROSS-REFERENCE TO RELATED APPLICATIONS

The present application claims priority from commonly owned U.S. Provisional Patent Application No. 61/584,667 filed Jan. 9, 2012, the content of which is expressly incorporated herein by reference in its entirety.

II. FIELD

The present disclosure is generally related to transmission of configuration change messages between an access point and a station.

III. DESCRIPTION OF RELATED ART

In wireless networks, stations (e.g., cell phones, personal digital assistants (PDAs), personal computing devices, laptops, and other computing devices) connect to an access point (e.g., a router) using wireless communication links. The access point may be connected to one or more networks and stations connected to the access point may access networks via the wireless communication links to the access point. The access point may periodically broadcast a beacon frame to stations within a coverage area associated with the access point. The beacon frame is broadcast by the access point in accordance with a beacon interval. The beacon frame may indicate that data intended for one of the stations is stored at the access point. The beacon frame may also indicate a change in the configuration of the access point.

Each of the stations connected to the access point may operate in synchronous mode or asynchronous mode. A station operating in the synchronous mode is configured to receive the beacon frame from the access point and determine whether the beacon frame indicates that the access point is storing data intended for the station. The station may also determine whether the beacon frame indicates that a configuration change has occurred at the access point. If the beacon frame indicates that the access point is not storing data intended for the station and that no configuration changes have occurred, the station may transition to a low power mode (e.g., a sleep mode). At a subsequent time prior to broadcasting a next beacon frame, the station transitions out of the low power mode and prepares to receive the next beacon frame. If the beacon frame indicates that a configuration change has been made and/or that the access point is storing data intended for the station, the station may initiate communication with the access point to determine the configuration change and/or to receive the data stored at the access point. If a configuration change has occurred, the station may modify a configuration of the station based on information associated with the configuration change received from the access point. Thus, stations operating in the synchronous mode are able to conserve battery power by transitioning into the low power mode in between transmission of each beacon frame when the station does not need to receive data, and/or configuration change data, from the access point. Because stations operating in the synchronous mode receive each beacon frame, each station receives notification of each configuration change that occurs at the access point and is able to synchronize the configuration of the station with the configuration of the access point.

Unlike stations operating in the synchronous mode, stations operating in the asynchronous mode may transition into an asynchronous low power mode that may be longer than the beacon interval. Accordingly, stations operating in the asynchronous mode may not receive each beacon frame. If a beacon frame identifying an access point configuration change is transmitted by an access point while a station is in the asynchronous low power mode, the station may not receive notification of the configuration change when the station transitions out of the asynchronous low power mode. Thus, stations operating in the asynchronous mode may remain configured according to out of date access point configuration information.

IV. SUMMARY

Systems and methods of transmitting configuration change messages between an access point and a station are disclosed. In a particular embodiment, the described techniques may find application in Institute of Electrical and Electronics Engineers (IEEE) 802.11ah compliant devices that may have low duty cycles. To illustrate, a wireless sensor that communicates over an IEEE 802.11ah compliant network may wake up for a relatively short period of time to perform a few measurements, communicate results of the measurements to a destination via an access point (or communicate the results to the access point), and then sleep for a relatively long period of time. Because the wireless sensor is frequently in a sleep mode to conserve power, the wireless sensor may not be aware of network or system configuration that may have changed while the wireless sensor was in the sleep mode. After waking up, the wireless sensor may require information related to configuration changes from the access point. The disclosed techniques may enable updated configuration information to be communicated between the access point and the low duty cycle wireless sensor.

In a particular embodiment, a method includes transmitting a frame from a station to an access point. The frame includes a beacon sequence number related to a configuration of the access point. The method also includes, in response to transmitting the frame, receiving an update frame from the access point. The update frame indicates at least one change in the configuration of the access point.

In another particular embodiment, a method includes receiving a frame from a station at an access point. The frame includes a beacon sequence number identifying a last known configuration of the access point that was known to the station prior to the station entering a low power mode. The method also includes determining whether a current configuration of the access point is identified by the beacon sequence number received from the station in the frame. The method further includes, in response to determining that the current configuration is not identified by the beacon sequence number, transmitting an update frame that indicates at least one difference between the current configuration and the configuration identified by the beacon sequence number.

In another particular embodiment, a method includes transmitting, from a station to an access point, a frame requesting data for the station that is buffered by the access point. The method also includes, in response to transmitting the frame, receiving an update frame from the access point indicating at least one change in a configuration of the access point.

In another particular embodiment, a method includes receiving a frame from a station at an access point. The access point includes a flags register that stores information associated with stations that operate in an asynchronous mode. The method further includes determining whether the station operates in the asynchronous mode. The method also includes, in response to determining that the station operates in the asynchronous mode, determining information stored at the flags register that is associated with the station indicates that an update frame is to be transmitted to the station. The method further includes, in response to determining that the information indicates that an update frame is to be transmitted to the station, transmitting the update frame to the station. The update frame indicates at least one change in a configuration of the access point.

In another particular embodiment, a method includes transmitting a frame from a station to an access point. The method also includes, in response to transmitting the frame, receiving an acknowledgement frame including an updated beacon sequence number related to an updated configuration of the access point. The method further includes determining whether a last known configuration of the access point is identified by the updated beacon sequence number. The method also includes, in response to determining that the last known configuration of the access point is not identified by the updated beacon number, transmitting an update request frame to the access point.

In another particular embodiment, a method includes receiving a frame from a station at an access point. The method further includes, in response to receiving the frame, transmitting an acknowledgement frame including an updated beacon sequence number related to an updated configuration of the access point.

In a particular embodiment, an apparatus includes a processor and a memory storing instructions executable by the processor. The instructions are executable to initiate transmission of a frame from a station to an access point. The frame includes a beacon sequence number related to a configuration of the access point. The instructions are further executable, in response to transmission of the frame, to detect receipt of an update frame from the access point indicating at least one change in the configuration of the access point.

In another particular embodiment, an apparatus includes a processor and a memory storing instructions executable by the processor. The instructions are executable to detect receipt of a frame from a station at an access point. The instructions are further executable, in response to receiving the frame, to initiate transmission of an acknowledgement frame including an updated beacon sequence number related to an updated configuration of the access point.

In a particular embodiment, an apparatus includes means for receiving a frame from a station at an access point. The frame includes a beacon sequence number identifying a last known configuration of the access point that was known to the station prior to the station entering a low power mode. The apparatus also includes means for determining whether a current configuration of the access point is identified by the beacon sequence number received from the station in the frame. The apparatus further includes means for transmitting an update frame that indicates at least one difference between the current configuration and the configuration identified by the beacon sequence number in response to determining that the current configuration is not identified by the beacon sequence number.

In another particular embodiment, an apparatus includes means for transmitting a frame from a station to an access point. The apparatus also includes means for receiving an acknowledgement frame including an updated beacon sequence number related to an updated configuration of the access point in response to the frame. The apparatus further includes means for determining whether a last known configuration of the access point is identified by the updated beacon sequence number. The means for transmitting is further configured to transmit an update request frame to the access point in response to determining that the last known configuration of the access point is not identified by the updated beacon number.

In a particular embodiment, a non-transitory computer-readable medium includes program code that, when executed by a processor, causes the processor to initiate transmission of a frame from a station to an access point. The frame includes a beacon sequence number related to a configuration of the access point. The program code is executable to cause the processor, in response to transmission of the frame, to detect receipt of an update frame from the access point indicating at least one change in the configuration of the access point.

In a particular embodiment, a non-transitory computer-readable medium includes program code that, when executed by a processor, causes the processor to detect receipt of a frame from a station at an access point. The instructions are also executable to cause the processor, in response to receiving the frame, to initiate transmission of an acknowledgement frame including an updated beacon sequence number related to an updated configuration of the access point.

One advantage provided by at least one of the described embodiments includes an ability to efficiently and accurately provide current network/system configuration (i.e., access point configuration) to low power stations.

Other aspects, advantages, and features of the present disclosure will become apparent after review of the entire application, including the following sections: Brief Description of the Drawings, Detailed Description, and the Claims.

VI. DETAILED DESCRIPTION

Figure 1:
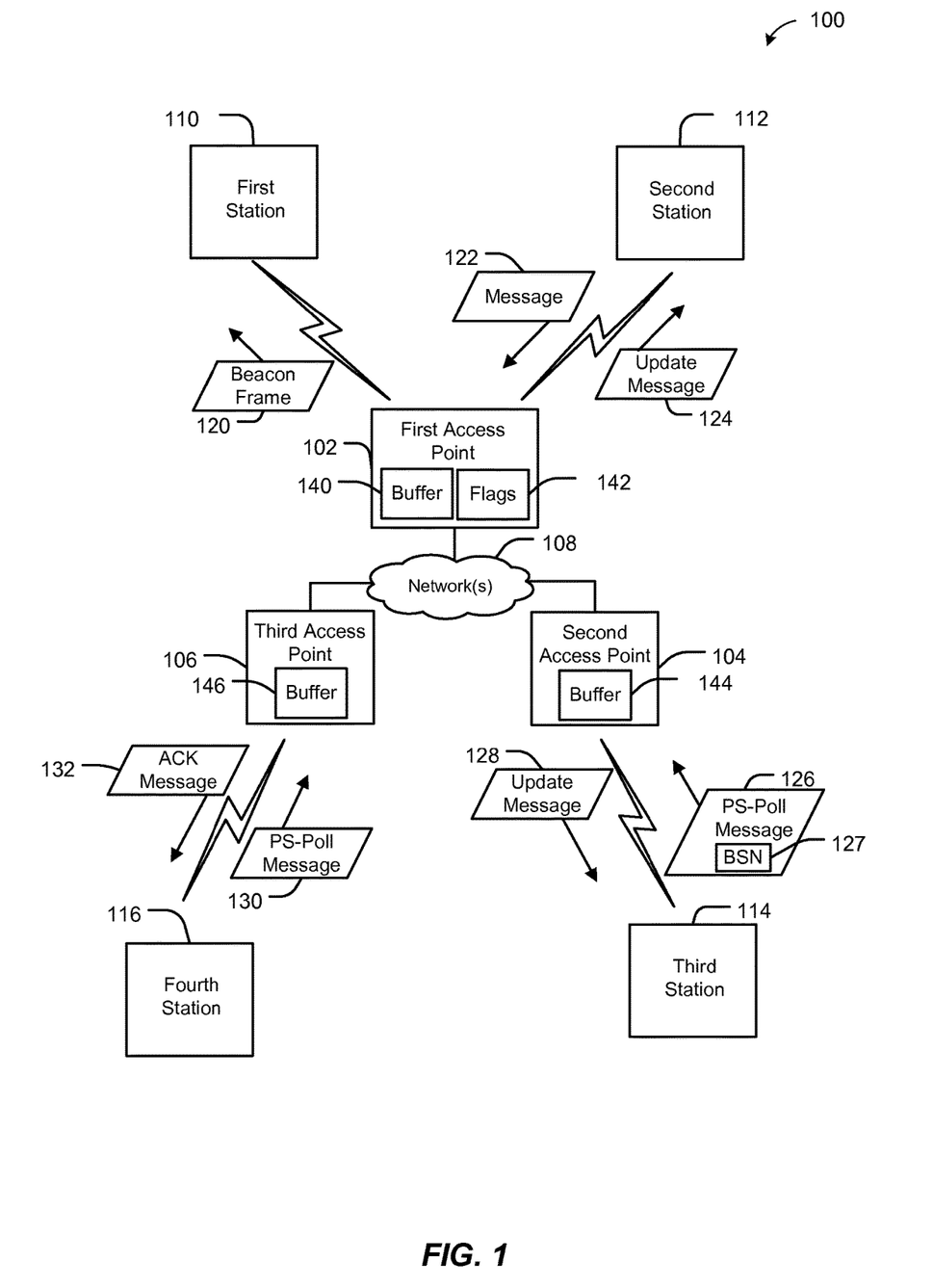
FIG. 1 is a diagram of a particular embodiment of a system operable to transmit configuration change messages between an access point and a station.

Referring to FIG. 1, a diagram of a particular embodiment of a system operable to transmit configuration change messages between access points and stations is shown and generally designated 100. The system 100 includes access points 102, 104, and 106. Each of the access points 102, 104, 106 may be connected to one or more stations and to one or more networks 108. The access points 102, 104, 106 may be connected to the one or more networks 108 via wired or wireless connections.

As shown in FIG. 1, a first access point 102 is connected to a first station 110 via a first wireless communication link and to a second station 112 via a second wireless communication link. A second access point 104 is connected to a third station 114 via a third wireless communication link, and a third access point 106 is connected to a fourth station 116 via a fourth wireless communication link. Each of the wireless communication links may be established according to one or more wireless communication protocols (e.g., an Institute of Electrical and Electronics Engineers (IEEE) 802.11 ah compliant protocol).

In a particular embodiment, a station may transmit a frame to an access point. The frame may request data for the station that is buffered by the access point (e.g., data for the station that was received and/or buffered by the access point while the station was in low power mode). For example, the frame may be a power save polling (PS-Poll) frame, which may be shorter in length than a probe request frame. Alternately, or in addition, the frame may be a trigger frame that causes the access point to send the data to the station. In a particular embodiment, the frame may include uplink data sent from the station to the access point. Upon receiving the frame, the access point may determine whether a flag stored in a register of the access point (e.g., a flag register) associated with the station indicates that an update frame is to be transmitted to the station. In response to determining that the flag indicates that an update frame is to be transmitted to the station, the access device may transmit the update frame to the station. In a particular embodiment, the update frame may indicate at least one change in a configuration of the access point. The station may receive the update frame and is thus aware of a current configuration of the access point and may communicate with the access point based on the current configuration.

To illustrate, the first station 110 may operate in a synchronous mode and the second station 112 may operate in an asynchronous mode. As shown in FIG. 1, the first access point 102 includes a buffer 140 and a flags register 142. At a first time, the first access point 102 may receive first data from one of the one or more networks 108. The first access point 102 may determine that an intended recipient of the first data is the first station 110 and may store the first data in the buffer 140. At the first time, the first station 110 may be in a low power mode. At a subsequent time, after the first station 110 has transitioned out of the low power mode, the first access point 102 may broadcast a beacon frame 120 and the first station 110 may receive the beacon frame 120. The first station 110 may determine that the beacon frame 120 indicates that the first data intended for the first station 110 is stored in the buffer 140 of the first access point 102. The first station 110 may also determine that the beacon frame 120 indicates that a configuration change has occurred at the first access point 102 prior to the broadcast of the beacon frame 120 and subsequent to the broadcast of a previous beacon frame (i.e., while the first station 110 was in sleep mode). The first station 110 may modify a configuration of the first station 110 based on the information included in the beacon frame 120.

The flags register 142 of the first access point 102 may store information associated with stations that are connected to the first access point 102 and that are operating in the asynchronous mode. For example, an entry in the flags register 142 may be associated with the second station 112. The first access point 102 may set the entry in the flags register 142 associated with the second station 112 to a first value in response to determining that the second station 112 has not communicated with the first access point 102 since the change in the configuration of the first access point 102 occurred. In a particular embodiment, the first access point 102 may be configured to set entries in the flags register 142 to the first value in response to significant changes made to the configuration of the first access point 102, while non-significant configuration changes would not cause the first access point 102 to set the entries in the flags register 142 to the first value. In a particular embodiment, whether a configuration change is "significant" may be defined in a standard (e.g., IEEE 802.11ah) and the first access point 102 may be configured to identify the significant configuration changes defined in the standard.

When the first access point 102 broadcasts the beacon frame 120, the second station 112 may be operating in the asynchronous low power mode and may not receive the configuration change notification indicated in the beacon frame 120. Because the second station 112 did not receive the beacon frame 120, a configuration of the second station 112 may be out of synch with the configuration of the first access point 102. In response to transitioning out of the asynchronous low power mode, the second station 112 may transmit a message 122 to the first access point 102. In a particular embodiment, the message 122 is a power save poll (PS-Poll) frame. Alternately, the frame may be a trigger frame that causes the first access point 102 to send data to the second station 112 (e.g., data for the second station 112 that was received and/or buffered by the first access point 102 while the second station 112 was in low power mode). In a particular embodiment, the frame may include uplink data sent from the second station 112 to the first access point 102.

In response to receiving the message 122 (e.g., the PS-Poll frame), the first access point 102 may determine whether the second station 112 operates in the asynchronous mode. In response to determining that the second station 112 operates in the asynchronous mode, the first access point 102 may determine whether the entry for the second station 112 in the flags register 142 is set to the first value, indicating that the second station 112 has not communicated with the first access point 102 since the change in the configuration of the first access point 102 occurred. When the entry in the flags register 142 is set to the first value, the first access point 102 transmits an update message 124 to the second station 112.

In a particular embodiment, the update message 124 may include information that identifies one or more parameter values in the current configuration of the first access point 102 that differ in value from the one or more parameter values in a previous configuration of the first access point 102. In another embodiment, the update message 124 may include information that identifies all of or a predetermined set of parameter values associated with the configuration of the first access point 102. In yet another embodiment, the update message 124 may include information that indicates that the configuration of the first access point 102 has changed. The second station 112 may modify its configuration based on the information included in the update message 124 in response to receiving the update message 124.

In another embodiment, the update message 124 may be an acknowledgement (ACK) frame that includes an update bit. A first value of the update bit may indicate that the first access point 102 does not have data to send to the second station 112. A second value of the update bit may indicate that the first access point 102 has data to send to the second station 112. The data may include information associated with the configuration change at the first access point 102. Alternatively, or in addition, the data may include information received from a network (e.g., one of the networks 108) that is intended for the second station 112 and that is stored in the buffer 140. In response to determining that the update bit included in the acknowledgement message (e.g., the update message 124) is set to the first value, the second station 112 may transition into the asynchronous low power mode. In response to determining that the update bit included in the acknowledgement message (e.g., the update message 124) is set to the second value, the second station 112 may refrain from transitioning into the asynchronous low power mode until after the second station 112 receives the data from the first access point 102.

In a particular embodiment, the update message 124 may be a frame that is compatible with IEEE 802.11ah wireless networks, such as one or more frames defined in the IEEE 802.11ah standard, one or more modified update frames, a probe response frame, a channel change frame, an extended channel switch announcement (ECSA) frame, an operating mode change frame, a very high throughput (VHT) operating mode notification frame, another frame, or a combination thereof.

In a particular embodiment, the second access point 104 includes a buffer 144. The buffer 144 of the second access point 104 may operate as described with reference to the buffer 140 of the first access point 102. For example, the second access point 104 may receive second data addressed to the third station 114 via the networks 108. The third station 114 may operate in the asynchronous mode. The second access point 104 may store the second data in the buffer 144 until the third station 114 transmits a message to the second access point 104 indicating that the third station 114 is ready to receive the data.

By setting a value of an entry in a flags register associated with the third station 114 to the first value in response to changing the configuration of the second access point 104, the second access point 104 is able to determine whether the third station 114 was in the asynchronous low power mode when a beacon frame indicating the configuration change at the second access point 104 was broadcast. Thus, in response to receiving a PS-Poll message from the third station 114, the second access point 104 is able to automatically determine whether the third station 114 has received notification of the configuration change and, if not, automatically transmit an update message 124 including information that identifies the configuration change to the third station 114.

In another particular embodiment, a station communicating with an access point may transmit a frame to the access point. The frame may request data for the station that is buffered by the access point (e.g., data for the station that was received and/or buffered by the access point while the station was in low power mode). For example, the frame may be a power save polling (PS-Poll) frame. Alternately, or in addition, the frame may be a trigger frame that causes the access point to send the data to the station. In a particular embodiment, the frame may include uplink data sent from the station to the access point. The frame may include a beacon sequence number related to a configuration of the access point (i.e., a last known configuration of the access point that was known to the station prior to the station entering a low power mode). The access point may receive the frame and may determine that the beacon sequence number included in the frame corresponds to an 'old' configuration of the access point (i.e., not a current configuration of the access point). The access point may then transmit an update frame that indicates at least one difference between the current configuration and the old configuration identified by the received beacon sequence number. In an alternate embodiment, the access point may schedule transmission of the update frame to the station (e.g., during a period when the station is not in a sleep mode or a power-save mode) and may transmit the update frame during the scheduled time. Thus, the access point may refrain from transmitting the update frame to the station until the station exits the sleep mode or the power-save mode. In yet another alternate embodiment, the access point may transmit an acknowledgement (ACK) frame including information, such as an update bit field, that notifies the station that an update frame is available (i.e., a current configuration is available). When the station receives the acknowledgement frame, the station may transmit an update request frame to the access point, and the access point may then transmit the update frame to the station.

To illustrate, the second access point 104 may be configured to communicate with the third station 114 via a wireless communication link. A configuration change may occur at the second access point 104 while the third station 114 is in the asynchronous low power mode, as described with reference to FIGS. 2-3. In a particular embodiment, the configuration change is associated with a channel configuration. For example, the second access point 104 may determine that a channel used by the second access point 104 to communicate with the third station 114 and other stations (not shown) may need to be temporarily quiet (i.e., no traffic). The second access point 104 may modify its configuration information to indicate that the channel is to be quiet. In a particular embodiment, the second access point 104 may change a current transmission or operating channel, may change an operation mode, or any combination thereof. For example, the channel change may be a channel switch or an extended channel switch. As another example, the operation mode change may include modification of enhanced distribution channel access (EDCA) parameters, modification of a quiet information element, modification of a direct sequence spread spectrum (DSSS) parameter set, modification of a contention-free (CF) parameter set, modification of a frequency-hopping (FH) parameter set, modification of a high-throughput (HT) operation element, or any combination thereof.

In response to modifying the configuration, the second access point 104 may modify (e.g., increment or decrement) a beacon sequence number that identifies a current configuration of the second access point 104. For example, prior to modifying the configuration of the second access point 104 to indicate that the channel is to be quiet, the beacon sequence number may have a value of X. In response to modifying the configuration, the second access point 104 may modify the beacon sequence number to a value of X+1 (e.g., an increment).

Prior to the change of configuration at the second access point 104, the third station 114 may have transitioned into the asynchronous low power mode. The third station 114 may store information indicating that the beacon sequence number associated with the second access point 104 has a value of X. The value of X stored at the third station 114 represents or corresponds to the last configuration of the second access point 104 that was known to the third station 114 prior to transitioning into the asynchronous low power mode. The third station 114 is unable to detect that the configuration of the second access point 104 has changed while the third station 114 is in the asynchronous low power mode. When the third station 114 transitions out of the asynchronous low power mode, the beacon sequence number stored at the third station 114 indicates that the configuration of the second access point 104 is the configuration associated with the beacon sequence number value of X. When the third station 114 transitions out of the asynchronous low power mode, the current beacon sequence number stored at the second access point 104 has a value of X+1.

When the third station 114 transitions out of the asynchronous low power mode, the third station 114 transmits a message to the second access point 104. The message may include a PS-Poll message 126 requesting data for the third station 114 that is buffered by the second access point 104. Alternately, or in addition, the message may include a trigger frame that causes the access point to send the data to the station. In a particular embodiment, the message may include uplink data sent from the third station 114 to the second access point 104. In a particular embodiment, the PS-Poll message 126 may include the beacon sequence number 127 that is stored at the third station 114 (e.g., the beacon sequence number having a value of X). The PS-Poll message 126 may be received by the second access point 104.

In response to receiving the PS-Poll message 126 from the third station 114, the second access point 104 may determine whether the beacon sequence number 127 included in the PS-Poll message 126 (e.g., the beacon sequence number having a value of X) identifies the current beacon sequence number stored at the second access point 104 (e.g., the beacon sequence number having a value of X+1). In response to determining that the beacon sequence number 127 included in the PS-Poll message 126 does not identify the current beacon sequence number stored at the second access point 104, the second access point 104 may transmit an update message 128 to the third station 114. The update message 128 may be similar to the update message 124 and may include information similar to the information included in the update message 124.

For example, the update message 128 may include information that identifies one or more parameter values in the current configuration of the second access point 104 that differ in value from the one or more parameter values in a previous configuration of the second access point 104. In another embodiment, the update message 128 may include information that identifies all of or a predetermined set of parameter values associated with the configuration of the second access point 104. In yet another embodiment, the update message 128 may include information that indicates that the configuration of the second access point 104 has changed. In response to receiving the update message 128, the third station 114 may modify its configuration based on the information included in the update message 128.

In another particular embodiment, the second access point 104 may transmit an acknowledgement frame (not shown) to the third station 114 instead of or in addition to transmitting the update message 128. The acknowledgement frame may include an update bit (e.g., a flag). In a particular embodiment, the update bit may indicate whether the beacon sequence number 127 stored at the third station 114 identifies the current beacon sequence number stored at the second access point 104. For example, a first value of the update bit may indicate that the beacon sequence number 127 stored at the third station 114 matches the current beacon sequence number stored at the second access point 104. A second value of the update bit may indicate that the beacon sequence number 127 stored at the third station 114 does not match the current beacon sequence number stored at the second access point 104.

In another particular embodiment, the update bit may indicate that the second access point 104 has data to send to the third station 114. For example, a first value of the update bit may indicate that the second access point 104 does not have data to send to the third station 114. A second value of the update bit may indicate that the second access point 104 has data to send to the third station 114. In a particular embodiment, the data may be related to the configuration change at the second access point 104. In another embodiment, the data may be related either to the configuration change at the second access point 104 or may include data received from a network (e.g., one of the networks 108) that is intended for the third station 114.

The third station 114 may receive the acknowledgement frame and determine whether the update bit is set to the first value or the second value. When the update bit is set to the first value, the third station 114 may determine that the second access point 104 does not have data to send to the third station 114, and the third station 114 may transition back into the asynchronous low power mode. In a particular embodiment, when the update bit is set to the second value, the third station 114 may delay transitioning back into the asynchronous low power mode until after the third station 114 receives the data from the access point 104. In another embodiment, the third station 114 may transmit an update request message (not shown) to the second access point 104 indicating that the third station 114 is ready to receive the data from the second access point 104. The second access point 104 may transmit an update message (e.g., the update message 128) in response to receiving the update request from the third station 114. In a particular embodiment, the update message may include the configuration change data as described with reference to the update messages 124 and 128. Alternatively, or in addition, the update message may include data received from a network (e.g., one of the networks 108) that is intended for the third station 114.

By receiving the beacon sequence number 127 stored at the third station 114 in the PS-Poll message 126, the second access point 104 is able to determine whether the third station 114 was in the asynchronous low power mode when a beacon frame indicating a configuration change at the second access point 104 was broadcast by the second access point 104. Thus, the second access point 104 is able to automatically transmit the update message 128 including information that identifies the configuration change to the third station 114 in response to receiving the PS-Poll message 126.

In particular embodiment, a station may transmit a frame (e.g., a PS-Poll frame, a trigger frame, a frame requesting buffered data, and/or a frame including uplink data) to an access point and may receive an acknowledgement frame including an updated beacon sequence number related to an updated configuration of the access point in response to the frame. The station may determine whether a last known configuration of the access point is identified by the updated sequence number. If the last known configuration of the access point is not identified by the received updated beacon sequence number, the station may transmit an update request frame to the access point. The access point may transmit an update frame to the station, the update frame indicating at least one change in the last known configuration of the access point that was known by the station.

As illustrated, the fourth station 116 may operate in the asynchronous mode and transition into the asynchronous low power mode. While the fourth station 116 is in the asynchronous low power mode, a configuration of the third access point 106 may be modified. Subsequent to the modification of the configuration of the third access point 106, the fourth station 116 may transition out of the asynchronous low power mode and transmit a PS-Poll message 130 to the third access point 106. The third access point 106 may receive the PS-Poll message 130 and transmit an acknowledgement message 132 to the fourth station 116. The acknowledgement message 132 may include a current beacon sequence number that identifies the current configuration of the third access point 106.

In response to receiving the acknowledgement message 132, the fourth station 116 may determine whether a beacon sequence number stored at the fourth station 116 corresponds to the configuration identified by the current beacon sequence number included in the acknowledgement message 132. When the beacon sequence number stored at the fourth station 116 matches the current beacon sequence number included in the acknowledgement message 132, the fourth station 116 may determine that the fourth station 116 is aware of the current configuration of the third access point 106. When the beacon sequence number stored at the fourth station 116 does not match the current beacon sequence number included in the acknowledgement message 132, the fourth station 116 may determine that the fourth station 116 is not aware of the current configuration of the third access point 106 and that the fourth station 116 needs to modify its configuration. In response to determining that the beacon sequence number stored at the fourth station 116 does not match the current beacon sequence number included in the acknowledgement message 132, the fourth station 116 may transmit an update request message (not shown) to the third access point 106.

In response to receiving the update request message at the third access point 106, the third access point 106 may transmit an update message (not shown). The update message transmitted by the third access point 106 may be similar to the update message 128 described above.

In a particular embodiment, the third access point 106 includes a buffer 146. The buffer 146 of the third access point 106 may operate as described with reference to the buffer 140 of the first access point 102. For example, the third access point 106 may receive third data addressed to the fourth station 116 via the networks 108. The fourth station 116 may operate in the asynchronous mode. The third access point 106 may store the third data in the buffer 146 until the fourth station 116 transmits a message to the third access point 106 indicating that the fourth station 116 is ready to receive the data.

By receiving the current beacon sequence number stored at the third access point 106 in the acknowledgement message 132, the fourth station 116 is able to determine whether the fourth station 116 was in the asynchronous low power mode when a configuration change at the third access point 106 occurred. Thus, the fourth station 116 is able to automatically transmit the update request message to the third access point 106 and the third access point 106 is able to transmit the update message (not shown) that includes information that identifies the configuration change to the access point 106.

Figure 2:
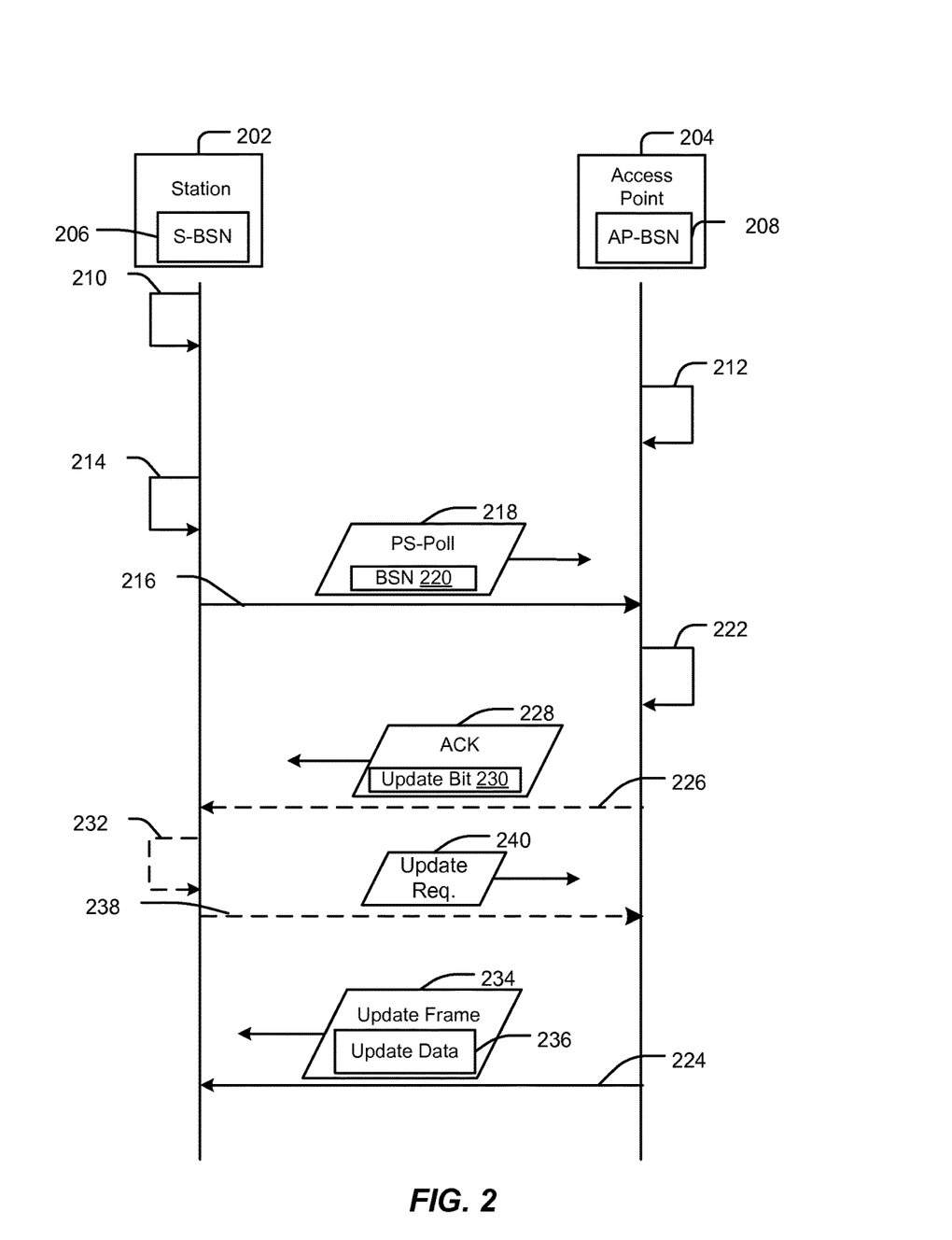
FIG. 2 is a diagram of particular embodiment of a method of transmitting configuration change messages between an access point and a station in the system of FIG. 1.

Referring to FIG. 2, a diagram of a particular embodiment of a method of transmitting configuration change messages between access points and stations is disclosed and generally designated 200. In FIG. 2, a station 202 and an access point 204 are shown. In a particular embodiment, the access point 204 may be the second access point 104 of FIG. 1. As shown in FIG. 2, the access point 204 may store a current beacon sequence number (e.g., access point beacon sequence number (AP-BSN)) 208. The current beacon sequence number 208 may identify a current configuration of the access point 204. In a particular embodiment, the station 202 may store a beacon sequence number (e.g., station beacon sequence number (S-BSN)) 206. The station beacon sequence number 206 may identify a last known configuration of the access point 204 that is known to the station 202.

At a first time, the station beacon sequence number 206 may be set to a value of X and the current beacon sequence number 208 may be set to a value of X. The station 202 may enter an asynchronous low power mode, at 210. While the station 202 is in the asynchronous low power mode, the access point 204 may modify a configuration of the access point 204, at 212, and the current beacon sequence number 208 may be incremented to X+1. Because the station 202 is in the asynchronous low power mode, the station 202 may not receive a notification (e.g., a beacon frame, an update message, etc.) that the configuration of the access point 204 has changed.

At 214, the station 202 may transition out of the asynchronous low power mode. Subsequently, the station 202 transmits a PS-Poll message 218 to the access point 204, at 216. The PS-Poll message 218 may include the station beacon sequence number 206 stored at the station 202. At 222, the access point 204 may receive the PS-Poll message 218 from the station 202 and determine whether the station beacon sequence number 206 corresponds to the current beacon sequence number 208 stored at the access point 204.

In response to determining that the station beacon sequence number 206 does not correspond to the current beacon sequence number 208, the access point 204 may transmit an update frame 234 (e.g., the update message 128), at 224. The update frame 234 may include update data 236. In a particular embodiment, the update data 236 may include information that identifies one or more parameter values in the current configuration of the access point 204 that differ in value from the one or more parameter values in a previous configuration of the access point 204 (e.g., the configuration identified by the station beacon sequence number 206 stored at the station 202). In another embodiment, the update data 236 may include information that identifies all of or a predetermined set of parameter values associated with the configuration of the access point 204. In yet another embodiment, the update data 236 may include other information that indicates that the configuration of the access point 204 has changed. In response to receiving the update frame 234, the station 202 may modify its configuration (not shown) based on the update data 236 included in the update frame 234.

In an alternative embodiment, the access point 204 may transmit an acknowledgement frame 228 to the station 202 in response to determining that the station beacon sequence number 206 does not correspond to the current beacon sequence number 208, at 226. The acknowledgement frame 228 may include an update bit 230 (e.g., a flag) that indicates whether the station beacon sequence number 206 stored at the station 202 corresponds to the current beacon sequence number 208 stored at the access point 204. For example, a first value of the update bit 230 may indicate that the station beacon sequence number 206 stored at the station 202 matches the current beacon sequence number 208 stored at the access point 204. A second value of the update bit 230 may indicate that the station beacon sequence number 206 stored at the third station 114 does not match the current beacon sequence number 208 stored at the second access point 104.

At 232, the station 202 may receive the acknowledgement frame 228 and determine whether the update bit 230 is set to the first value or the second value. When the update bit 230 is set to the first value, the station 202 may determine that the current configuration of the access point 204 is the configuration identified by the station beacon sequence number 206 stored at the station 202. When the update bit 230 is set to the second value, the station 202 may determine that the current configuration of the access point 204 is not the configuration corresponding to the station beacon sequence number 206 stored at the station 202. In response to determining that the update bit 230 is set to the second value, the station 202 may transmit an update request message 240 to the access point 204, at 238. The update request message 240 may request that the access point 204 transmit an update message (e.g., one of the update messages 124, 128). At 224, the third access point 106 may transmit the update frame 234 in response to receiving the update request frame 234 at the access point 204. The update frame 234 may be similar to the update messages 124, 128 described with reference to FIG. 1.

Alternately, in response to the update bit 230 having the second value, the station 202 may remain in an active state (i.e., a state other than an asynchronous low power state or off state) to await transmission of the update frame 234 from the access point 204, and the access point 204 may automatically transmit the update frame 234 after transmitting the acknowledgement frame 228.

Figure 3:
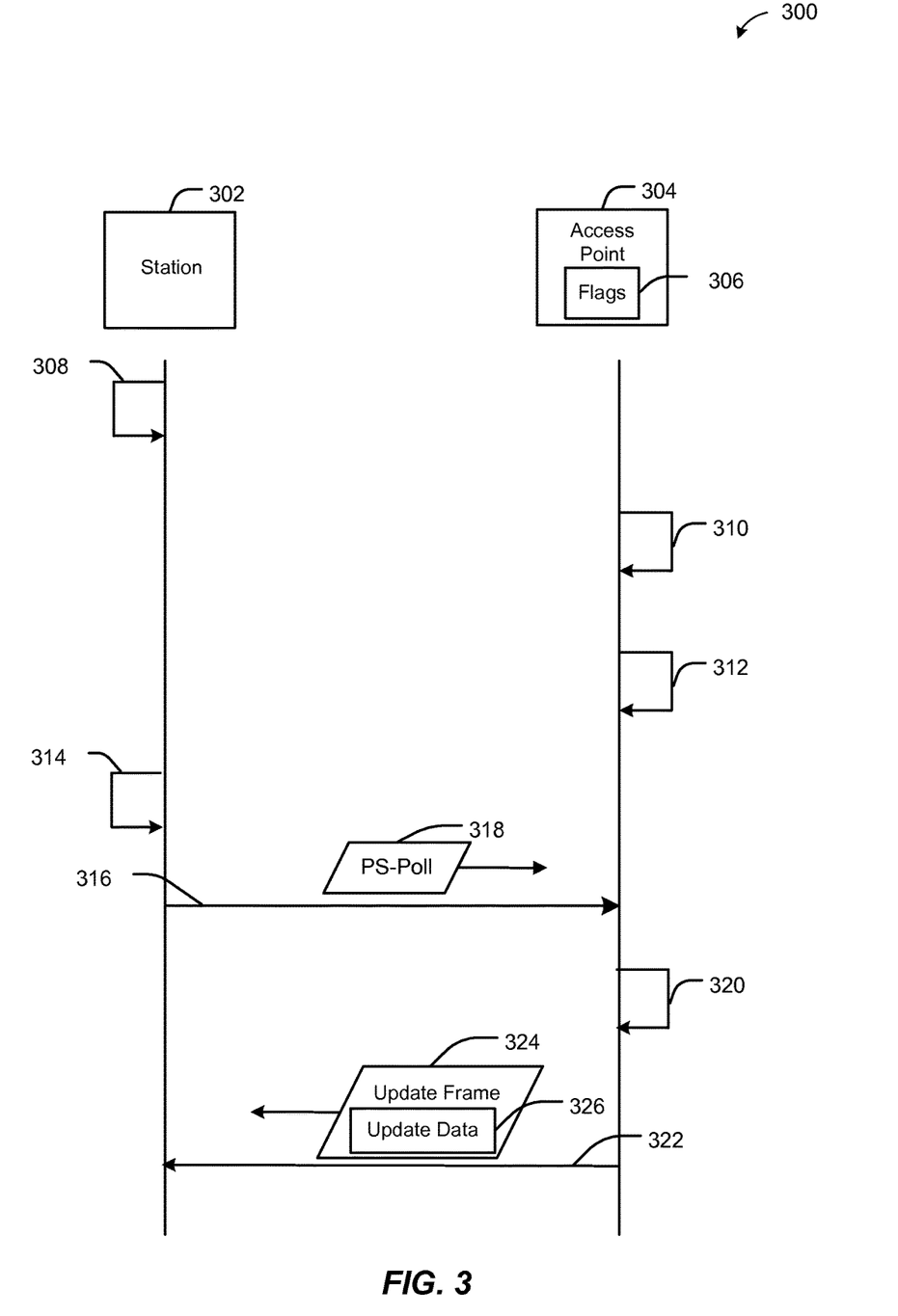
FIG. 3 is a diagram of another embodiment of a method of transmitting configuration change messages between an access point and a station in the system of FIG. 1.

Referring to FIG. 3, a diagram of another embodiment of a method of transmitting configuration change messages between an access point and a station is disclosed and generally designated 300. In FIG. 3, a station 302 and an access point 304 are shown. The access point 304 includes a flags register 306. The flags register 306 may be the flags register 142 of FIG. 1.

At 308, the station 302 may enter an asynchronous low power mode. While the station 302 is in the asynchronous low power mode, the access point 304 may modify a configuration of the access point 304, at 310. Because the station 302 is in the asynchronous low power mode, the station 302 may not receive a notification (e.g., a beacon frame, an update message, etc.) that the configuration of the access point 304 has changed. At 312, the access point 304 may initialize one or more entries in the flags register 306 to a value that indicates that station(s) associated with the one or more entries (e.g., including the station 302) may not have received notification of the configuration change, as explained with reference to FIG. 1.

At 314, the station 302 may transition out of the asynchronous low power mode. Subsequently, the station 302 transmits a PS-Poll message 318 to the access point 304, at 316. At 320, the access point 304 may receive the PS-Poll message 318 from the station 302 and determine whether the value of the entry in the flags register 306 that is associated with the station 302 indicates that the station 302 did not receive the notification of configuration change of the access point 304. In response to determining that the station 302 did not receive the notification, the access point 304 may transmit an update frame 324 to the station 302, at 322. The update frame 324 may include update data 326, as described above with reference to FIGS. 1 and 2.

Figure 4:
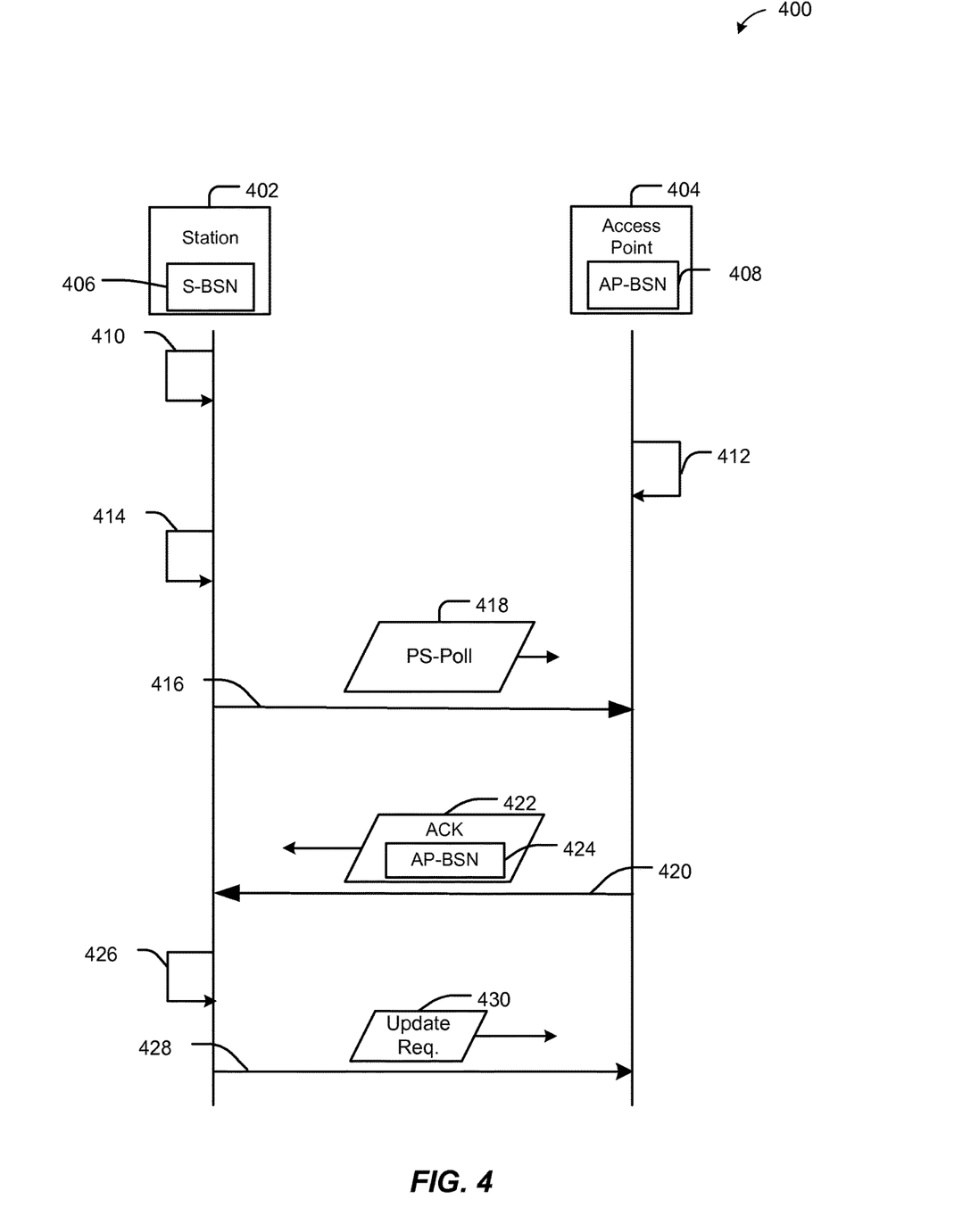
FIG. 4 is a diagram of another embodiment of a method of transmitting configuration change messages between an access point and a station in the system of FIG. 1.

Referring to FIG. 4, a diagram of another embodiment of a method of transmitting configuration change messages between an access point and a station is disclosed and generally designated 400. In FIG. 4, a station 402 and an access point 404 are shown. As shown in FIG. 4, the access point 404 may include a current beacon sequence number 408 (e.g., an access point beacon sequence number (AP-BSN)). The current beacon sequence number 408 may identify a current configuration of the access point 404. In a particular embodiment, the station 402 may include a beacon sequence number 406 (e.g., a station beacon sequence number (S-BSN)). The station beacon sequence number 406 may identify a last known configuration of the access point 404 that is known to the station 402.

At a first time, the station beacon sequence number 406 may be set to a value of X and the current beacon sequence number 408 may be set to a value of X. The station 402 may enter an asynchronous low power mode, at 410. While the station 402 is in the asynchronous low power mode, the access point 404 may modify a configuration of the access point 404, at 412, and the current beacon sequence number 408 may be incremented to X+1. Because the station 402 is in the asynchronous low power mode, the station 402 may not receive a notification (e.g., a beacon frame, an update message, etc.) that the configuration of the access point 404 has changed.

At 414, the station 402 may transition out of the asynchronous low power mode. Subsequently, the station 402 transmits a PS-Poll message 418 to the access point 404, at 416. However, in contrast to the PS-Poll message 218 of FIG. 2, the PS-Poll message 418 may not include the station beacon sequence number 406 stored at the station 402. In response to receiving the PS-Poll message 418, the access point 404 may transmit an acknowledgement frame 422 to the station 402, at 420. The acknowledgement frame 422 may include the current beacon sequence number 408 stored at the access point 404 (shown in FIG. 4 as the AP-BSN 424 in the acknowledgement frame 422). The AP-BSN 424 may identify or correspond to the current configuration of the access point 404.

At 426, the station 402 may receive the acknowledgement frame 422 and determine whether the station beacon sequence number 406 corresponds to the access point configuration that is identified by the current beacon sequence number 408. When the current beacon sequence number 408 and the station beacon sequence number 406 have the same value, the station 402 may determine that the current configuration of the access point 404 is the configuration identified by the station beacon sequence number 406 stored at the station 402. When the current beacon sequence number 408 and the station beacon sequence number 406 do not have the same value, the station 402 may determine that the current configuration of the access point 404 is not the configuration identified by the station beacon sequence number 406 stored at the station 402.

In response to determining that the current configuration of the access point 404 is not the configuration identified by the station beacon sequence number 406, the station 402 may transmit an update request frame 430 to the access point 404, at 428. In response to the update request frame 430, the access point may send update data, such as one or more of the update messages 124, 128 described with reference to FIG. 1, to the station 402.

Figure 5:
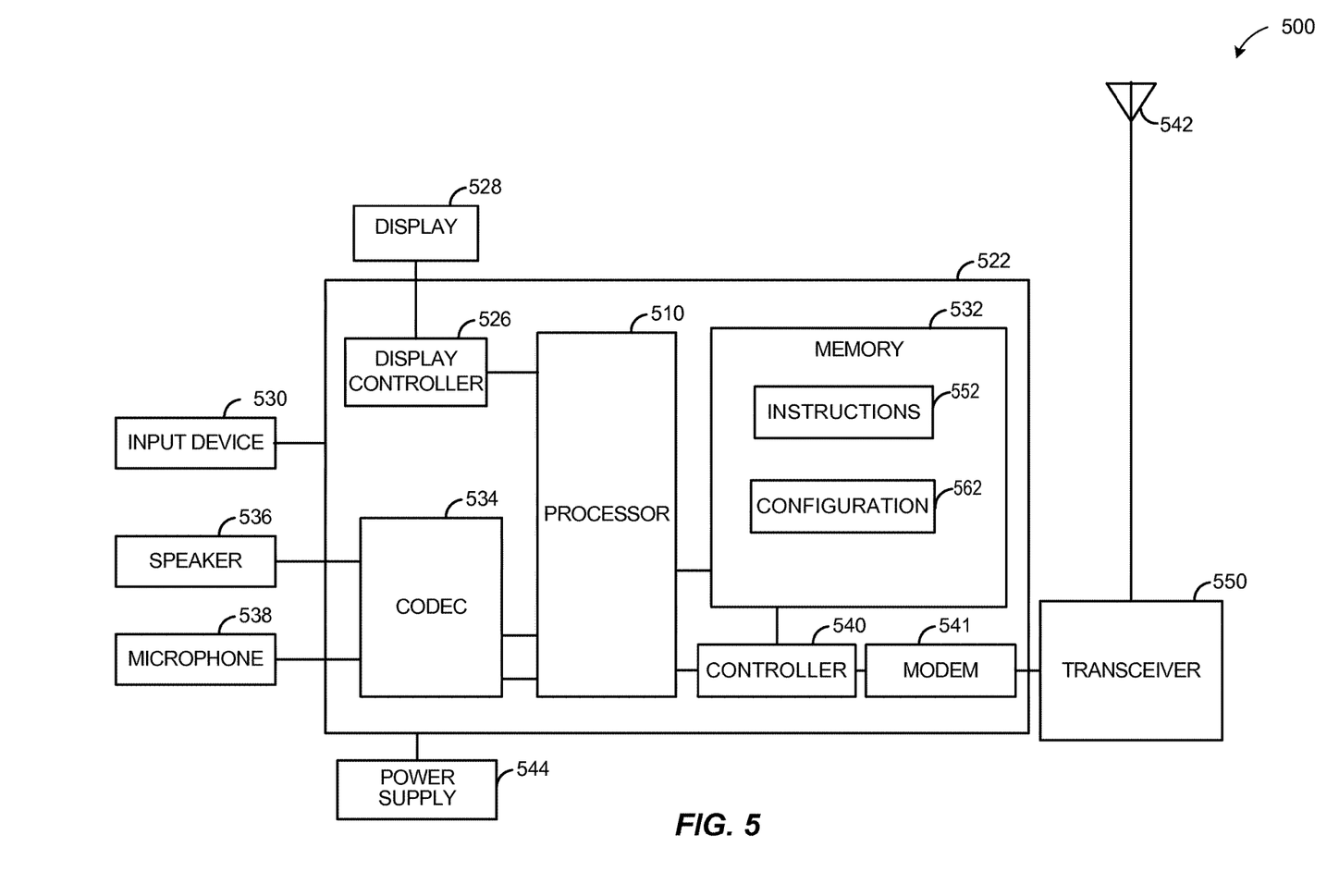
FIG. 5 is a block diagram of a particular embodiment of a station operable to transmit configuration change messages to an access point according to FIGS. 1-4.

Referring to FIG. 5, a block diagram of a particular embodiment of a station operable to transmit configuration change messages to an access point according to FIGS. 1-4 is disclosed and generally designated 500. The station 500 includes a processor, such as a processor 510, coupled to a memory 532.

The memory 532 may be a non-transitory computer readable storage medium that stores data (e.g., representative configuration data 562), instructions, or both. In a particular embodiment, the memory 532 may include instructions 552 that may be executable by the processor 510 to cause the processor 510 to perform one or more functions of the station 500. For example, the instructions 552 may include user applications, an operating system, other executable instructions, or a combination thereof. The instructions may be executable by the processor 510 to cause the processor to perform at least a portion of the functionality described with respect to FIGS. 1-4.

The station 500 may include a transceiver 550 for sending and receiving signals and/or data packets. For example, the station 500 may function as a transmitter when the station 500 transmits frames (e.g., PS-Poll frames, trigger frames, frames requesting buffered data, frames including uplink data, etc.), update request frames, or any other data to an access point. As another example, the station 500 may function as a receiver when the station 500 receives an acknowledgement frame, an update frame, or any other data from the access point.

In a particular embodiment, the transceiver 550 may provide means for transmitting a frame (e.g., a PS-Poll frame) from a station to an access point. The transceiver 550 may also provide means for receiving an update frame from the access point indicating at least one change in a configuration of the access point, in response to the frame. The transceiver 550 may also provide means for receiving an acknowledgement frame including an updated beacon sequence number related to an updated configuration of the access point in response to the frame. In a particular embodiment, the processor 510 may provide means for determining whether a last known configuration of the access point is identified by the updated beacon sequence number.

FIG. 5 also shows a display controller 526 that may be coupled to the processor 510 and to a display 528. A coder/decoder (CODEC) 534 (e.g., an audio and/or voice CODEC) may be coupled to the processor 510. A speaker 536 and a microphone 538 may be coupled to the CODEC 534. FIG. 5 also indicates that a wireless controller 540 may be coupled to the processor 510 and to the transceiver 550 (via a modem 541) that is coupled to a wireless antenna 542. In a particular embodiment, the processor 510, the display controller 526, the memory 532, the modem 541, the CODEC 534, the wireless controller 540, and the transceiver 550 are included in a system-in-package or system-on-chip device 522.

In a particular embodiment, an input device 530 and a power supply 544 are coupled to the system-on-chip device 522. Moreover, in a particular embodiment, as illustrated in FIG. 5, the display 528, the input device 530, the speaker 536, the microphone 538, the wireless antenna 542, and the power supply 544 are external to the system-on-chip device 522. However, each of the display 528, the input device 530, the speaker 536, the microphone 538, the wireless antenna 542, and the power supply 544 can be coupled to a component of the system-on-chip device 522, such as an interface or a controller.

It should be noted that although FIG. 5 depicts a wireless communications device, the processor 510 and the memory 532 may be integrated into other devices, such as a mobile device, a camera, a multimedia player, an entertainment unit, a navigation device, a personal digital assistant (PDA), a fixed location data unit, a computer (e.g., a tablet computer, a laptop computer, a desktop computer, a portable computer, etc.), a media device, a router or gateway device, or another device configured to wirelessly communicate data.

Figure 6:
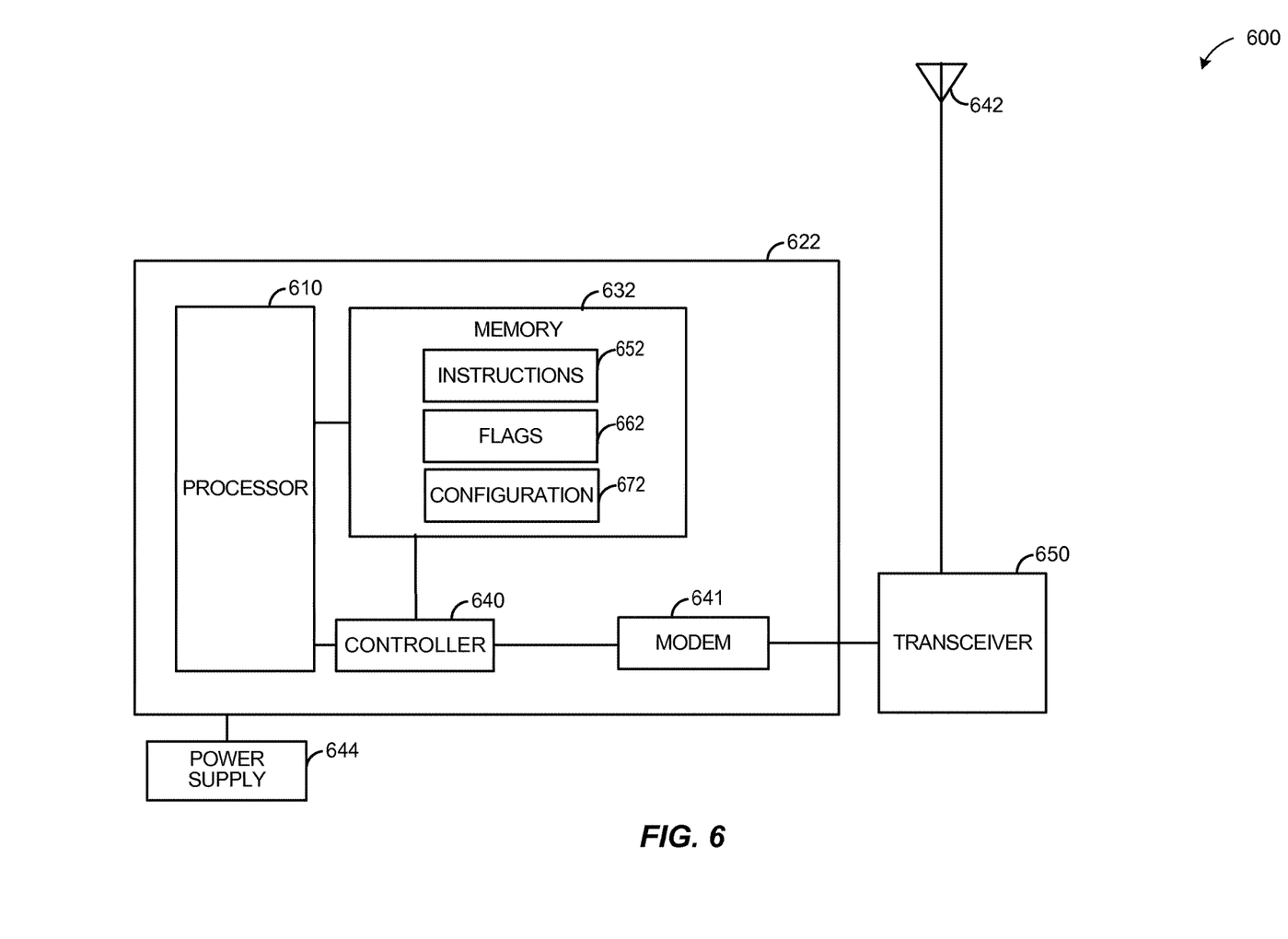
FIG. 6 is a block diagram of a particular embodiment of an access point operable to transmit configuration change messages to a station according to FIGS. 1-4.

Referring to FIG. 6, a block diagram of a particular embodiment of an access point operable to transmit configuration change messages to a station according to FIGS. 1-4 is disclosed and generally designated 600. The access point 600 includes a processor, such as a processor 610, coupled to a memory 632.

The memory 632 may be a non-transitory computer readable storage medium that stores data (e.g., representative configuration data 672), instructions, or both. In a particular embodiment, the memory 632 may also include one or more registers including flags 662 associated with corresponding stations in communication with the access point 600. In a particular embodiment, the flags 662 may indicate that an updated configuration of the access point 600 is to be transmitted to a station.

In a particular embodiment, the memory 632 may include instructions 652 that may be executable by the processor 610 to cause the processor 610 to perform one or more functions of the access point 600. For example, the instructions 652 may include user applications, an operating system, or other executable instructions, or a combination thereof. The instructions 652 may be executable by the processor 610 to cause the processor 610 to perform at least a portion of the functionality described with respect to any of FIGS. 1-4.

The access point 600 may include a transceiver 650 for sending and receiving signals and/or data packets. For example, the access point 600 may function as a transmitter when the access point 600 transmits signals and/or packets and may function as a receiver when the access point 600 receives signals and/or packets. To illustrate, the access point 600 may function as a transmitter when the access point 600 transmits an acknowledgement frame, an update frame, or any combination thereof, to a station. The access point 600 may also function as a receiver when the access point 600 receives a frame (e.g., a PS-Poll frame, a trigger frame, a frame requesting data buffered at the access point 600, a frame including uplink data, etc.), an update request, or any combination thereof, from the station.

FIG. 6 also indicates that a modem 641 and a wireless controller 640 may be coupled to the processor 610 and to the transceiver 650 that is coupled to a wireless antenna 642. In a particular embodiment, the processor 610, the memory 632, the modem 641, the wireless controller 640, and the transceiver 650 are included in a system-in-package or system-on-chip device 622. In a particular embodiment, a power supply 644 is coupled to the system-on-chip device 622. Moreover, in a particular embodiment, the wireless antenna 642 and the power supply 644 are external to the system-on-chip device 622.

It should be noted that although FIG. 6 depicts a wireless communications device, the processor 610 and the memory 632 may be integrated into other devices, such as a mobile device, a camera, a multimedia player, an entertainment unit, a navigation device, a personal digital assistant (PDA), a fixed location data unit, a computer (e.g., a tablet computer, a laptop computer, a desktop computer, a portable computer, etc.), a media device, a router or gateway device, or another device configured to wirelessly communicate data.

In conjunction with the described embodiments, an apparatus is disclosed that includes means for receiving a frame from a station at an access point, the frame including a beacon sequence number identifying a last known configuration of the access point that was known to the station prior to entering a lower power mode. For example, the means for receiving may include a component of the access points 102, 104, and 106 of FIG. 1, the access point 204 of FIG. 2, the access point 304 of FIG. 3, the access point 404 of FIG. 4, or the access point 600 of FIG. 6, the transceiver 650 of FIG. 6, one or more other devices configured to receive a frame, or any combination thereof.

The apparatus also includes means for determining whether a current configuration of the access point is identified by the beacon sequence number received from the station in the frame. For example, the means for determining may include the processor 610 of FIG. 6, a component of the access points 102, 104, and 106 of FIG. 1, the access point 204 of FIG. 2, the access point 304 of FIG. 3, the access point 404 of FIG. 4, or the access point 600 of FIG. 6, the transceiver 650 of FIG. 6, one or more other devices configured to determine whether a current configuration of the access point is identified by a beacon sequence number, or any combination thereof.

The apparatus includes means for transmitting an update frame that indicates at least one difference between the current configuration and the configuration identified by the beacon sequence number, in response to determining that the current configuration is not identified by the beacon sequence number. For example the means for transmitting the update frame may include a component of the access points 102, 104, and 106 of FIG. 1, the access point 204 of FIG. 2, the access point 304 of FIG. 3, the access point 404 of FIG. 4, or the access point 600 of FIG. 6, the transceiver 650 of FIG. 6, one or more other devices configured to transmit an update frame, or any combination thereof.

In conjunction with the described embodiments, an apparatus is disclosed that includes means for transmitting a frame from a station to an access point. For example, the means for transmitting may include a component of the stations 110, 112, 114, and 116 of FIG. 1, the station 202 of FIG. 2, the station 302 of FIG. 3, the station 402 of FIG. 4, or the station 500 of FIG. 5, the transceiver 550 of FIG. 5, one or more other devices configured to transmit a frame, or any combination thereof.

The apparatus includes means for receiving an acknowledgement frame including an updated beacon sequence number related to an updated configuration of the access point in response to the frame. For example, the means for receiving the acknowledgement frame may include a component of the stations 110, 112, 114, and 116 of FIG. 1, the station 202 of FIG. 2, the station 302 of FIG. 3, the station 402 of FIG. 4, or the station 500 of FIG. 5, the transceiver 550 of FIG. 5, one or more other devices configured to receive an acknowledgement frame, or any combination thereof.

The apparatus also includes means for determining whether a last known configuration of the access point is identified by the updated beacon sequence number. For example, the means for determining may include the processor 510 of FIG. 5, a component of the stations 110, 112, 114, and 116 of FIG. 1, the station 202 of FIG. 2, the station 302 of FIG. 3, the station 402 of FIG. 4, or the station 500 of FIG. 5, the transceiver 550 of FIG. 5, one or more other devices configured to determine whether a last known configuration of an access point is identified by an updated beacon sequence number, or any combination thereof. The means for transmitting is further configured to transmit an update frame to the access point in response to determining that a last known configuration of the access point is not identified by an updated beacon number.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
   receiving a first beacon frame at a station prior to entering into a low power mode, wherein the first beacon frame is configured to indicate first configuration parameters associated with an access point;
   in response to transitioning out of the low power mode, transmitting, from the station to the access point, a frame requesting updated configuration parameters included in a beacon frame missed by the station while the station was operating in the low power, wherein the frame includes information associated with the first configuration parameters received from the access point prior to the station entering into the low power mode;
   in response to transmitting the frame, receiving an update frame from the access point when the first configuration parameters are different than current configuration parameters associated with the access point, the update frame configured to indicate a change in at least one of the configuration parameters associated with the access point; and updating configuration parameters at the station based on the change in the at least one of the configuration parameters.

2. The method of claim 1, further comprising:
in response to transmitting the frame, receiving an acknowledgement frame including an update bit field, wherein the update bit field indicates that the update frame is available at the access point.

3. The method of claim 1, wherein the low power mode includes one of a sleep mode and a power off mode, and wherein the information associated with the first configuration parameters includes a beacon sequence number associated with the first beacon frame, and wherein the first configuration parameters are different than the current configuration parameters when the beacon sequence number is different than a current beacon sequence number associated with a current beacon frame.

4. The method of claim 1, wherein the change in the at least one of the configuration parameters occurs while the station was operating in the low power mode, and wherein the change in the at least one of the configuration parameters includes a channel change, an operating mode change, or a combination thereof, and wherein the channel change includes a channel switch or an extended channel switch.

5. The method of claim 1, wherein the frame comprises a power save polling frame.

6. The method of claim 4, wherein the operating mode change includes at least one of modification of enhanced distribution channel access (EDCA) parameters, modification of a quiet information element, modification of a direct sequence spread spectrum (DSSS) parameter set, modification of a contention-free (CF) parameter set, modification of a frequency-hopping (FH) parameter set, and modification of a high-throughput (HT) operation element.

7. A method comprising:
transmitting a first beacon frame to a station prior to the station entering into a low power mode, wherein the first beacon frame is configured to indicate first configuration parameters associated with an access point;
in response to transitioning out of the low power mode, receiving, at the access point, a frame requesting updated configuration changes included in a beacon frame missed by the station while the station operated in the low power mode, the frame including information associated with the first configuration parameters; and
in response to determining that the first configuration parameters are different than current configuration parameters associated with the access point, transmitting to the station an update frame configured to indicate a change in at least one of the configuration parameters associated with the access point.

8. The method of claim 7, further comprising:
in response to determining that the first configuration parameters are different than the current configuration parameters associated with the access point, scheduling transmission of the update frame to the station during a scheduled transmission time; and
transmitting the update frame to the station during the scheduled transmission time, wherein the scheduled transmission time is a time when the station is not in a sleep mode and is not in a power off mode.

9. The method of claim 7, further comprising:
in response to determining that the first configuration parameters are different than the current configuration parameters associated with the access point, transmitting an acknowledgement frame including an update bit field, wherein the update bit field indicates that the update frame is available at the access point.

10. The method of claim 7, wherein determining that the first configuration parameters are different than the current configuration parameters includes comparing a beacon sequence number associated with the first configuration parameters to a current beacon sequence number associated with the current configuration parameters.

11. The method of claim 7, wherein the update frame is an expanded channel switch announcement frame indicating a channel change of the access point or a very high-throughput (VHT) notification frame indicating an operating mode change of the access point.

12. The method of claim 7, wherein the frame is received from the station in response to the station transitioning out of an asynchronous low power mode.

13. The method of claim 7, wherein the current configuration parameters are stored at the access point prior to receipt of the frame from the station.

14. A method comprising:
in response to transitioning out of an low power mode, transmitting, from a station to an access point, a frame requesting updated configuration changes included in a beacon frame missed by the station while the station operated in the low power mode, wherein the frame includes information associated with first configuration parameters received at the station from the access point prior to the station entering into the low power mode;
in response to transmitting the frame, receiving an update frame from the access point when the first configuration parameters are different than current configuration parameters associated with the access point, wherein the update frame is configured to indicate a change in at least one of the configuration parameters associated with the access point; and
updating configuration parameters at the station based on the change in the at least one of the configuration parameters.

15. The method of claim 14, wherein the configuration parameters are different than the current configuration parameters when a first beacon sequence number associated with the first configuration parameters is different than a current beacon sequence number associated with the current configuration parameters.

16. The method of claim 14, wherein the frame comprises a power save polling (PS-Poll) frame or a trigger frame that causes the access point to send data to the station.

17. The method of claim 14, wherein the frame includes uplink data sent from the station to the access point.

18. The method of claim 14, wherein the change in the at least one of the configuration parameters occurs while the station was operating in the low power mode and wherein the low power mode includes one of a sleep mode and a power off mode.

19. The method of claim 14, wherein the change in the at least one of the configuration parameters includes a channel change, an operating mode change, or a combination thereof, wherein the channel change includes a channel switch or an extended channel switch, and wherein the operating mode change includes at least one of modification of enhanced distribution channel access (EDCA) parameters, modification of a quiet information element, modification of a direct sequence spread spectrum (DSSS) parameter set, modification of a contention-free (CF) parameter set, modification of a frequency-hopping (FH) parameter set, and modification of a high-throughput (HT) operation element.

20. A method comprising:
receiving, at an access point from a station, a frame requesting updated configuration changes included in a beacon frame missed by the station while the station operated in a low power mode, wherein the frame includes information associated with first configuration parameters sent to the station from the access point prior to the station entering into a low power mode; and
in response to determining that the first configuration parameters are different than current configuration parameters associated with the access point, transmitting an update frame to the station, wherein the update frame is configured to indicate a change in at least one of the configuration parameters associated with the access point.

21. The method of claim 20, wherein the update frame includes a current beacon sequence number associated with current configuration of the access point, and further comprising incrementing, at the access point, the current beacon sequence number in response to an additional configuration change of the access point.

22. The method of claim 20, further comprising clearing a flag corresponding to information associated with the station after transmitting the update frame to the station.

23. The method of claim 20, further comprising refraining from transmitting the update frame to the station until the station exits a sleep mode or a power-save mode.

24. The method of claim 21, further comprising:
in response to determining that a beacon sequence number is not the same as the current beacon sequence number, transmitting an acknowledgement frame that includes the current beacon sequence number to the station, wherein the beacon sequence number is associated with the first configuration parameters sent to the station prior to the station entering into a low power mode.

25. A method comprising:
in response to transitioning out of a low power mode, transmitting, to an access point, a frame requesting updated configuration changes included in a beacon frame missed by a station while the station operated in the low power mode;
in response to transmitting the frame, receiving an acknowledgement frame configured to indicate information associated with current configuration parameters of the access point; and
in response to determining that a change in the configuration parameters of the access point occurred while the station operated in the low power mode, transmitting an update request frame to the access point;
receiving an update frame from the access point in response to transmitting the update request, the update frame configured to indicate a change in at least one of the configuration parameters of the access point; and
updating configuration parameters at the station based on the change in the at least one of the configuration parameters.

26. The method of claim 25, wherein the frame comprises a power save polling (PS-Poll) frame having a shorter length than a probe request frame.

27. A method comprising:
receiving, at an access point from a station, a frame requesting updated configuration parameters included in a beacon frame missed by the station while the station was operating in a low power mode;
in response to determining that the station operates in a low power mode, transmitting an acknowledgement frame that includes a configuration change indictor, the configuration change indicator configured to indicate that current configuration parameters associated with the access point are different than first configuration parameters sent to the station from the access point prior to the station entering into the low power mode; and
in response to transmitting the acknowledgement frame, receiving an update request frame from the station; and
in response to receiving the update request frame, transmitting an update frame to the station indicating a change in at least one of the configuration parameters of the access point.

28. The method of claim 27, wherein the configuration change indicator further indicates that a beacon sequence number associated with a current confirmation parameters is not the same as a beacon sequence number sent to the station from the access point prior to the station entering into the low power mode.

29. An apparatus comprising:
a processor; and
a memory storing instructions executable by the processor to:
in response to transitioning out of a low power mode, initiate transmission, to an access point, of a frame requesting updated configuration parameters included in a beacon frame missed by a station while the station was operating in the low power, the frame including information associated with first configuration parameters received at the station from the access point prior to the station entering the low power mode; and
in response to transmission of the frame, detect receipt of an update frame from the access point when the first configuration parameters are different than current configuration parameters associated with the access point, the update frame indicating a change in at least one of the configuration parameters associated with the access point; and
updating configuration parameters at the station based on the change in the at least one of the configuration parameters.

30. The apparatus of claim 29, wherein the instructions are further executable by the processor to:
in response to transmission of the frame, detect receipt of an acknowledgement frame including an update bit field, wherein the update bit field indicates that the update frame is available at the access point;
initiate transmission of an update request frame to the access point; and
in response to transmission of the update request frame, detect receipt of the update frame from the access point.

31. The apparatus of claim 29, wherein the processor is integrated into at least one of a mobile device, a camera, a multimedia player, an entertainment unit, a navigation device, a personal digital assistant (PDA), and a portable computer.

32. An apparatus comprising:
a processor; and
a memory storing instructions executable by the processor to:
detect, at an access point, receipt of a frame requesting updated configuration parameters included in a beacon frame missed by a station while the station was operating in a low power;
in response to determining that the station operates in an low power mode, initiate transmission of an acknowledgement frame that includes information associated with current configuration parameters of the access point;

in response to transmission of the acknowledgement frame, detect receipt of an update request frame from the station when the current configuration parameters are different than first configuration parameters sent to the station from the access point prior to entering into the low power mode; and in response to receiving the update request frame, transmitting an update frame to the station indicating a change in at least one of the current configuration parameters associated with the access point.

33. The apparatus of claim 32, wherein the first configuration parameters are different than the current configuration parameters when a beacon sequence number associated with the first configuration parameters is not the same as a current beacon sequence number associated with the current configuration parameters.

34. An apparatus comprising:

means for receiving, at an access point, a frame requesting updated configuration parameters included in a beacon frame missed by a station while the station was operating in a low power mode, the frame including information associated with first configuration parameters sent to the station from the access point prior to the station entering a low power mode;

means for determining that the station has operated in the low power mode; and means for transmitting, in response to determining that the first configuration parameters are different than current configuration parameters associated with the access point, an update frame that indicates at least one difference between the current configuration parameters and the first configuration parameters.

35. An apparatus comprising:

means for transmitting, in response to transitioning out of a low power mode, a frame from a station to an access point, the frame requesting updated configuration parameters included in a beacon frame missed by the station while the station was operating in the low power;

means for receiving an acknowledgement frame that includes a configuration change indictor, the configuration change indicator configured to indicate that current configuration parameters associated with the access point are different than first configuration parameters received at the station from the access point prior to the station entering into the low power mode; and wherein the means for transmitting is further configured to transmit an update request frame to the access point based on the configuration change indicator.

36. A non-transitory computer-readable medium including program code that, when executed by a processor, causes the processor to:

in response to transitioning out of a low power mode, initiate transmission, from a station to an access point, a frame requesting updated configuration parameters included in a beacon frame missed by the station while the station was operating in the low power, the frame including information associated with first configuration parameters received at the station from of the access point prior to the station entering into the low power mode;

in response to transmission of the frame, detect receipt of an update frame from the access point when the first configuration parameters are different than current configuration parameters associated with the access point, the update frame configured to indicate a change in at least one of the configuration parameters of the access point; and updating configuration parameters at the station based on the change in the at least one of the configuration parameters.

37. The non-transitory computer-readable medium of claim 36, further comprising program code that, when executed by the processor, causes the processor to:

in response to transmission of the frame, detect receipt of an acknowledgement frame including an update bit field, wherein the update bit field indicates that the update frame is available at the access point;

initiate transmission of an update request frame to the access point; and in response to transmission of the update request frame, detect receipt of the update frame from the access point.

38. A non-transitory computer-readable medium comprising program code that, when executed by a processor, causes the processor to:

detect, at an access point, receipt of a frame requesting updated configuration parameters included in a beacon frame missed by a station while the station was operating in a low power mode;

in response to determining that the station operates in a low power mode, initiate transmission of an acknowledgement frame that includes information associated with current configuration parameters associated with the access point;

in response to transmission of the acknowledgement frame, detect receipt of an update request frame from the station when the current configuration parameters are different than first configuration parameters sent to the station from the access point prior to the station entering into the low power mode; and in response to receiving the update request frame, transmitting an update frame to the station indicating at least one change in the configuration parameters associated with the access point.

39. The non-transitory computer-readable medium of claim 38, wherein the current configuration parameters are stored at the access point prior to the receipt of the update request frame from the station.

* * * * *